(12) United States Patent
Lee et al.

(10) Patent No.: US 9,843,732 B2
(45) Date of Patent: Dec. 12, 2017

(54) MOBILE TERMINAL FOR DISPLAYING MULTIPLE IMAGES AND METHOD OF CONTROLLING THE SAME

(71) Applicant: LG ELECTRONICS INC., Seoul (KR)

(72) Inventors: Kyungju Lee, Seoul (KR); Joonsoo Kim, Seoul (KR); Youngho Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/109,490

(22) PCT Filed: Sep. 18, 2014

(86) PCT No.: PCT/KR2014/008713
§ 371 (c)(1),
(2) Date: Jul. 1, 2016

(87) PCT Pub. No.: WO2015/111819
PCT Pub. Date: Jul. 30, 2015

(65) Prior Publication Data
US 2016/0330379 A1    Nov. 10, 2016

(30) Foreign Application Priority Data

Jan. 21, 2014    (KR) ........................ 10-2014-0007385

(51) Int. Cl.
*H04N 5/232*    (2006.01)
*G06F 3/0484*    (2013.01)
(Continued)

(52) U.S. Cl.
CPC ....... *H04N 5/23293* (2013.01); *G06F 3/0482* (2013.01); *G06F 3/04845* (2013.01);
(Continued)

(58) Field of Classification Search
CPC .......... H04N 5/23293; H04N 5/23216; H04N 1/215; H04N 1/2125; G06F 3/0482; G06F 3/04845; G06F 3/04883
See application file for complete search history.

(56) References Cited

U.S. PATENT DOCUMENTS

2005/0181774 A1    8/2005    Miyata
2010/0331047 A1    12/2010   Bilcu et al.
(Continued)

FOREIGN PATENT DOCUMENTS

KR    10-2013-0013678 A    2/2013

*Primary Examiner* — Tuan Ho
(74) *Attorney, Agent, or Firm* — Birch, Stewart, Kolasch & Birch, LLP

(57) ABSTRACT

Provided is a mobile terminal including: a setting unit that is configured to set a reference image; an imaging unit that captures multiple subordinate images associated with the reference image that is set; a controller that brings the multiple captured subordinate images into a group based on the reference image and stores the group, and determines a display position on the reference image, of each of the subordinate images brought into the group, according to the preset reference; and a display unit, on whose entire screen the reference image is displayed and a graphic object corresponding to each of the subordinate images brought into the group is output to the determined display position, when a group image view mode is activated.

21 Claims, 12 Drawing Sheets

(51) Int. Cl.
*G06F 3/0488* (2013.01)
*G06F 3/0482* (2013.01)
*H04N 1/21* (2006.01)

(52) U.S. Cl.
CPC ......... *G06F 3/04883* (2013.01); *H04N 1/215* (2013.01); *H04N 1/2125* (2013.01); *H04N 5/23216* (2013.01)

(56) References Cited

U.S. PATENT DOCUMENTS

| | | | |
|---|---|---|---|
| 2011/0249149 A1* | 10/2011 | Ishida | H04N 5/23238 348/239 |
| 2013/0002903 A1* | 1/2013 | Manico | G06Q 50/2057 348/231.6 |
| 2013/0027353 A1 | 1/2013 | Hyun | |
| 2013/0314443 A1 | 11/2013 | Grassick | |
| 2013/0328931 A1 | 12/2013 | Wolcott et al. | |
| 2016/0094773 A1* | 3/2016 | Maciuca | H04N 5/23206 348/207.11 |

* cited by examiner

MOBILE TERMINAL FOR DISPLAYING MULTIPLE IMAGES AND METHOD OF CONTROLLING THE SAME

CROSS REFERENCE TO RELATED APPLICATIONS

This application is the National Phase of PCT/KR2014/008713 filed on Sep. 18, 2014, which claims priority under 35 U.S.C. §119(a) to Korean Patent Application No. 10-2014-0007385 filed on Jan. 21, 2014, all of which are hereby expressly incorporated by reference into the present application.

TECHNICAL FIELD

The present disclosure relates to a mobile terminal capable of displaying multiple images and a method of controlling the mobile terminal.

BACKGROUND ART

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In addition, functions of a camera built into a mobile terminal have been improved, and various types of high-capacity storage media have been available for use in the mobile terminal. Thus, the user can store more images in a storage unit of the mobile terminal than before. Accordingly, the user takes the trouble to perform many operations in order to search a great number of stored images for a desired specific image. In the related art, as part of an effort to solve this problem, many thumbnail images, each of which results from reducing the size of a stored image, are configured to be displayed at a time.

However, generally, it is difficult to check multiple associated images at a time because the mobile terminal displays the thumbnail images, size-reduced versions of the stored images, only in the chronological order in which the stored images were captured or stored. Specifically, if the multiple images are similar to one another, the user experiences inconvenience of making a comparison between them many times and performing many operations in order to search for a desired specific image.

DISCLOSURE SUMMARY OF THE INVENTION

Therefore, an object of the present invention is to provide a mobile terminal that is realized such that a user can check multiple photographic images associated with one another at a time and a method of controlling the mobile terminal.

Another aspect of the detailed description is to provide a mobile terminal that is realized such that multiple photographic images associated with one another are arranged in meaningful positions, respectively, on an entire screen and thus a user can select a desired specific photographic image in easier, faster manner, and a method of controlling the mobile terminal.

A further aspect of the detailed description is to provide a mobile terminal that is realized such that pieces of view history information on multiple photographic images associated with one another are generated and thus a user can identify at a glance a photographic image that he/she viewed with interest, and a method of controlling the mobile terminal.

To achieve these and other advantages and in accordance with the purpose of the present invention, as embodied and broadly described herein, there is provided a mobile terminal including: a setting unit that is configured to set a reference image; an imaging unit that captures multiple subordinate images associated with the reference image that is set; a controller that brings the multiple captured subordinate images into a group based on the reference image and stores the group, and determines a display position on the reference image, of each of the subordinate images brought into the group, according to the preset reference; and a display unit, on whose entire screen the reference image is displayed and a graphic object corresponding to each of the subordinate images brought into the group is output to the determined display position, when a group image view mode is activated.

In the mobile terminal, the control unit may output a thumbnail of each of the subordinate images brought into the group to one region of the display unit, and may determine a point at which a drag touch input applied to the thumbnail is terminated, as the display position of each of the subordinate images.

In the mobile terminal, the controller may automatically determine as the display position of the subordinate image a region of the reference image, to which the subordinate image is pattern-matched to the extent to which a pattern-matched region of the subordinate image is equal to or greater than a reference pattern-matched region.

In the mobile terminal, when a first touch input is detected as being applied to one among the graphic objects that are output to the display position, the controller may control the display unit in such a manner that additional information is displayed that relates to the subordinate image corresponding to the graphic object to which the touch input is detected as being applied.

In the mobile terminal, the pieces of additional information may include at least one or more pieces of information, among information on the number of the subordinate images that correspond to the display position to which the first touch input is detected as being applied, information on a place where the subordinate image is captured, information on a date and time at which the subordinate image is captured, information on a period of time for which the subordinate image is viewed, and information on the number of times that the subordinate image is viewed.

In the mobile terminal, when a second touch input is detected as being applied to one among the graphic objects that are displayed on the reference image, the controller may control the display unit in such a manner that the subordinate image corresponding to the graphic object to which the second touch input is detected as being applied is output to an entire screen.

In the mobile terminal, when a touch in one direction is detected as being applied to the subordinate image that is output in a state where the subordinate image corresponding to the graphic object to which the second touch input is detected as being applied is output to the entire screen, the controller may control the display unit in such a manner that the next subordinate image corresponding to the one direction is output.

In the mobile terminal, when a preset input signal is detected in the state where the subordinate image is output to the entire screen, the controller may perform control in such a manner that the reference image is displayed back to the entire screen and a highlight effect is output to the graphic object corresponding to the previously-output subordinate image.

In the mobile terminal, based on the second touch input, the controller may generate view history information on each of the subordinate images brought in the group, and based on the generated view history information, the controller may differently change the graphic object corresponding to each of the subordinate images brought into the group.

In the mobile terminal, the controller may bring the subordinate images that are successively captured for a given time, into a group, may calculate weight based on the number of times that each of the subordinate images brought into one group is viewed, a period of time for which each of the subordinate images is viewed, and the number of times that each of the subordinate images is zoomed in, and may apply the calculated weight to the view history information.

In the mobile terminal, based on the generated view history information, the greater the number of times that the subordinate image is viewed, the more greatly the size of the graphic object corresponding to the subordinate image the controller may increase and output the graphic object that accordingly increases in size.

In the mobile terminal, the controller may output a thumbnail of each of the subordinate images brought into the group to the corresponding display position, and when an event occurs, based on the generated view history information, the controller may compare the number of times that each of the subordinate images is viewed, with a reference value and may perform control in such a manner that the thumbnail of the subordinate image that is viewed a smaller number of times than the reference value and the corresponding graphic object are deleted.

In the mobile terminal, the controller may perform control in such a manner that an image effect corresponding to the chronological order in which the subordinate images were captured is output to the graphic object corresponding to each of the subordinate images brought into the group.

In the mobile terminal, when the subordinate image corresponding to the graphic object is detected as being viewed, the controller may differently change the image effect that is output to the graphic object.

In the mobile terminal, if the multiple subordinate images are included in one display position, the controller may control the display unit in such a manner that a thumbnail of one representative subordinate image satisfying a preset condition is displayed on the display position.

In the mobile terminal, in response to a preset touch being detected as being applied to the thumbnail of the representative subordinate image, thumbnails of multiple other subordinate images may be displayed on one region of the display unit, and when a touch applied to one of the thumbnails of the multiple other subordinate images is dragged to the display position, the controller may control the display unit in such a manner that the thumbnail of the representative subordinate image is changed to the thumbnail to which the touch is applied.

In the mobile terminal, a command to delete the reference image is input in the group image view mode, the controller may delete the reference image and the subordinate images that are brought into the group based on the reference image together.

In the mobile terminal, if the setting unit sets first and second reference images, the controller may integrate the first and second reference images connectedly into one integration reference image based on one direction of the selected first reference image, may output the one integration reference image, and may update the display position of each of the subordinate images associated with the first and second reference images.

To achieve these and other advantages and in accordance with the purpose of this specification, as embodied and broadly described herein, there is provided a method of controlling a mobile terminal including: setting a reference image; capturing multiple subordinate images associated with the reference image that is set; bringing the multiple captured subordinate images into a group based on the reference image and determining a display position on the reference image, of each of the subordinate images brought into the group, according to the preset reference; and displaying the reference image on an entire screen and outputting a graphic object corresponding to each of the subordinate images brought into the group to the determined display position when a group image view mode is activated.

In the method, the reference image may be a photographic image to which each of the subordinate images brought into the group is pattern-matched to the extent to which a pattern-matched region of the each of the subordinate images is equal to or greater than a reference pattern-matched region, or a specific image that is selected from among already-stored images.

the multiple associated photographic images are arranged at points, respectively, on one reference image, and are displayed as arranged. Thus, the user can search for desired photographic images in easier, faster manner. In addition, the pieces of view history information on the multiple associated photographic images are generated and thus are displayed in a visually-distinguished manner. This provides an advantage of immediately recognizing the extent to which the user is interested in the corresponding subordinate image can be immediately recognized.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The computer may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

MODE FOR THE INVENTION DETAILED DESCRIPTION OF EMBODIMENTS OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
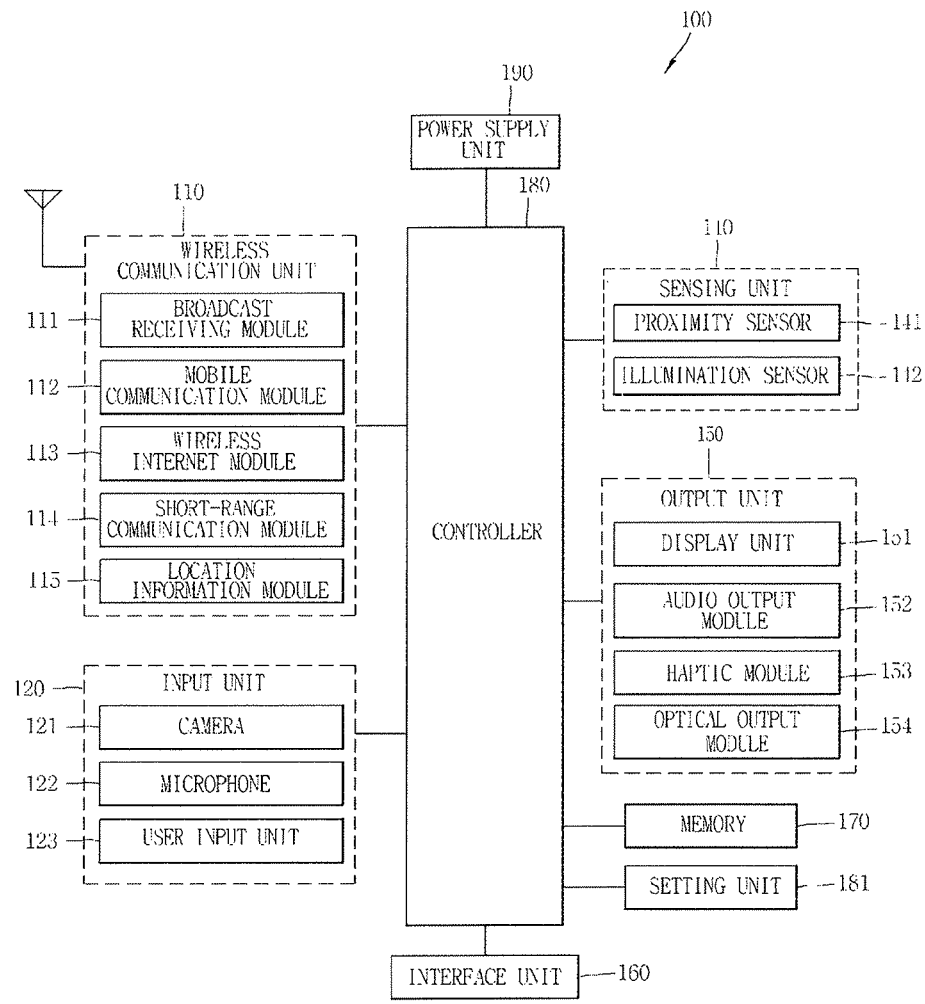
FIG. 1A is a block diagram for describing a mobile terminal according to the present invention.
Figure 1B:
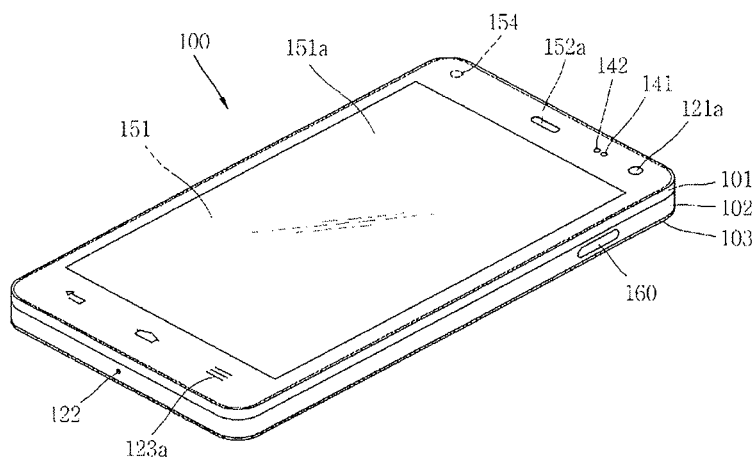
FIGS. 1B and 1C are diagrams illustrating the mobile terminal according to one embodiment of the present invention when viewed from different directions.
Figure 1C:
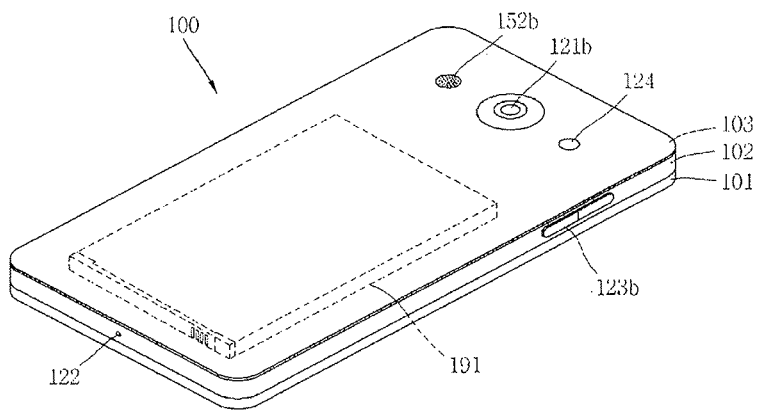

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing proofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to the present disclosure will be described.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

A CDMA wireless communication system is shown having a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1A) is typically configured inside the mobile terminal 100 to receive broadcast signals transmitted by the BT.

Global Positioning System (GPS) satellites 300 facilitate locating the position of at least one of plural mobile terminals 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

A setting unit 181 of the mobile terminal 100 according to an embodiment of the present invention, which is configured to include at least one or more among the constituents described above is configured to predetermine at least one reference image through a user input. When the reference image is set, according to a photographic signal, a camera 121 (hereinafter referred to as an "imaging unit") captures multiple subordinate images associated with the preset reference image.

At this point, the "reference image" is an image that is displayed on an entire screen of the mobile terminal, and that includes a common reference for bringing the multiple subordinate images into one group. For example, the reference image is an entire photographic image or a map image to which an image is pattern-matched to the extent to which a pattern-matched region of the image is equal to or greater than a reference pattern-matched region. The images each of which is pattern-matched to the extent to which the pattern-matched region of the image is equal to or greater than the reference pattern-matched region are brought into one group. In addition, the reference image may be a specific image that is selected from among images that are stored in advance in the memory 160.

In addition, at this point, the "subordinate image" corresponds to an image that is associated with the reference and is included as one portion of the reference image being set. For example, if an entire specific image is pattern-patched to one portion of the preset reference image, the specific image is a subordinate image of the preset reference image.

In addition, at this point, there is not limitation to types of the reference images and types of the subordinate images. For example, the reference images and the subordinated images each include an image captured through the camera 121 or an image that is displayed on a review screen after camera photographing, an image that results from storing (that is, capturing) screen information, as is, that is output to the display unit 151, an image that results from storing only a photograph or a picture that is included in a web page, one piece of screen information on a reproducible moving image file, a picture file or wallpaper that is stored in advance by a telecommunications carrier of the mobile terminal 100, an image that is downloaded from an external apparatus, and the like. Only for description convenience, the reference image or the subordinate image is referred to as a "reference photographic image," or a "subordinate photographic image," respectively.

When in this manner, the multiple subordinate images are captured, based on the predetermined image, the controller 180 of the mobile terminal 100 brings the multiple captured subordinate images into one group for storage. Accordingly, the reference image being set and the multiple subordinate images associated with the reference image being are stored as one group. In addition, the controller 180 determines a display position on the reference image, of each of the subordinate images brought into one group, according to a predetermined reference.

At this point, the display position of each of the subordinate images brought into one group is automatically determined through the pattern matching to the reference image. In such a case, the determined display position indicates a place or position on the reference image, in which the subordinate image is captured.

On the other hand, in a state where the gallery application is executed, when a group image view mode is activated, the display unit 151 of the mobile terminal 100 displays the reference image on an entire screen and outputs a graphic object corresponding to each of the subordinate images brought into one group to the display position determined by the controller 180. That is, the multiple associated subordinate images are displayed on meaningful points, respectively, on the reference image.

At this point, the graphic object is a thumbnail of the subordinate image corresponding to the display position determined by the controller 180. In addition, the graphic object is an image or text indicating that the subordinate image corresponding to the display position determined by the controller 180 is present. For example, the graphic object is output, in the shape of a clip image of an attachment file or in the shape of a position-based icon, on the display position determined by the controller 180.

As described above, according to the embodiments of the present invention, the multiple associated photographic images are arranged on the meaningful positions, respectively, on the entire screen, and this provides an advantage that the user can select a specific photographic image that he/she wants, in an easier, faster manner.

Control methods that are realized in the mobile terminal with the configuration described above, according to the embodiments of the present invention, are described below referring to the accompanying drawings.

Figure 2:
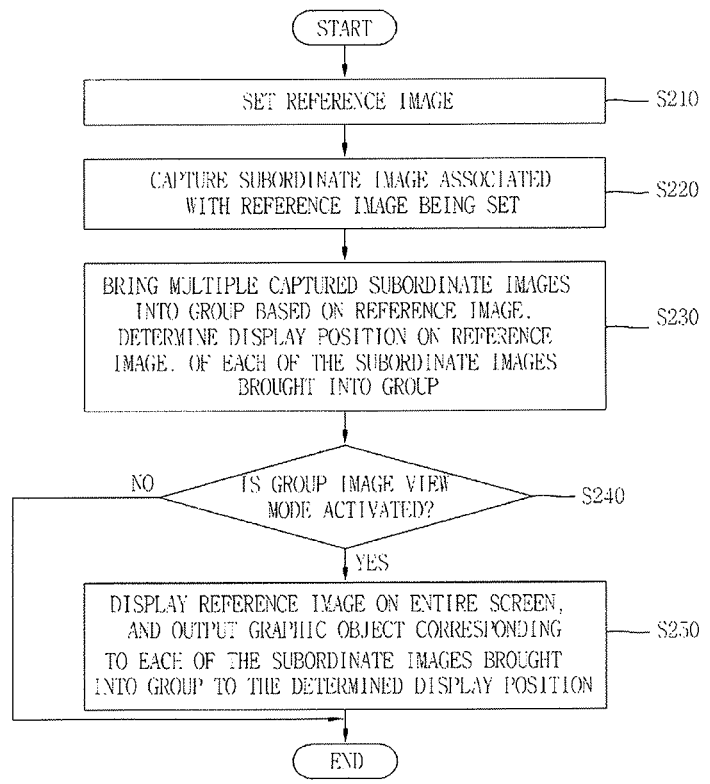
FIG. 2 is a flow chart for describing a method of controlling the mobile terminal according an embodiment of the present invention.

FIG. 2 is a flow chart for describing a method of controlling the mobile terminal according to an embodiment of the present invention. FIGS. 3A to 3D are diagrams for describing a method of outputting the multiple associated subordinate images on the reference image according to the embodiment of the present invention.

First, the mobile terminal 100 according to the embodiment of the present invention proceeds with a step of predetermining at least one reference image (S210).

To do this, the user executes, for example, a gallery application, and thus selects a specific photographic image from among the photographic images stored in advance in the memory 160. When the selected specific image is displayed, a "reference image setting" item is selected from a context menu that pops up according to operation of the mobile terminal, and thus determines the selected specific image as the reference image.

At this point, the "reference image," as described above, is the image that is displayed on the entire screen of the mobile terminal 100, and that includes the common reference for bringing other images into one group. For example, the reference image is the entire photographic image or the map image to which an image is pattern-matched to the extent to which a pattern-matched region of the image is equal to or greater than the reference pattern-matched region. The images each of which is pattern-matched to the extent to which the pattern-matched region of the image is equal to or greater than the reference pattern-matched region are brought into one group. In addition, the reference image may be a specific image that is selected from among images that are stored in advance in the memory 160.

For example, referring to FIG. 0.3A, in a state where a specific background image 301 is displayed on the display unit 151, when the user selects a "reference image setting" item 315 from a menu 310 that pops up, the specific background image 301 is set as the reference image. The reference image being set is stored separately on an already-designated folder (for example, a "group image folder") on an execution screen of the gallery application.

When in this manner, the reference image is set, according to the photographic signal, an imaging unit 121 captures the multiple subordinate images that are associated with the reference image being set (S220).

At this point, the multiple subordinate images associated with the reference image are photographic images, each of which is pattern-matched to the preset reference image to the extent to which a pattern-matched region of the photographic image is equal to or greater than the reference pattern-matched region and thus is included as one portion of the reference image.

Figure 3A:
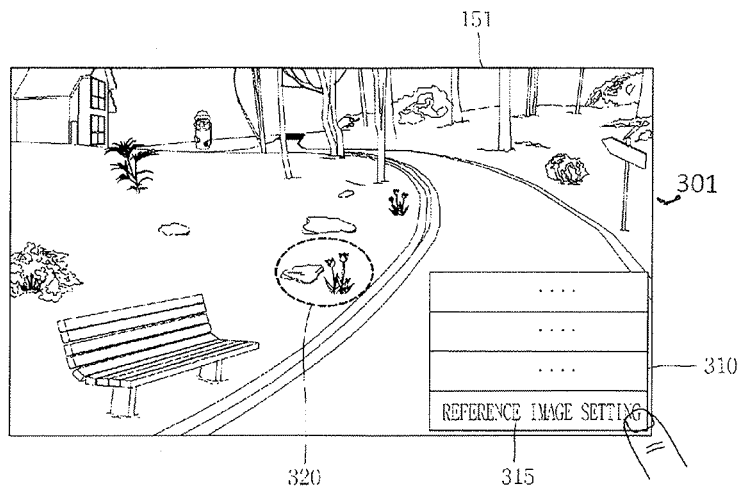
FIGS. 3A to 3D are diagrams for describing a method of outputting multiple associated subordinate images on a reference image according to the embodiment of the present invention.
Figure 3B:
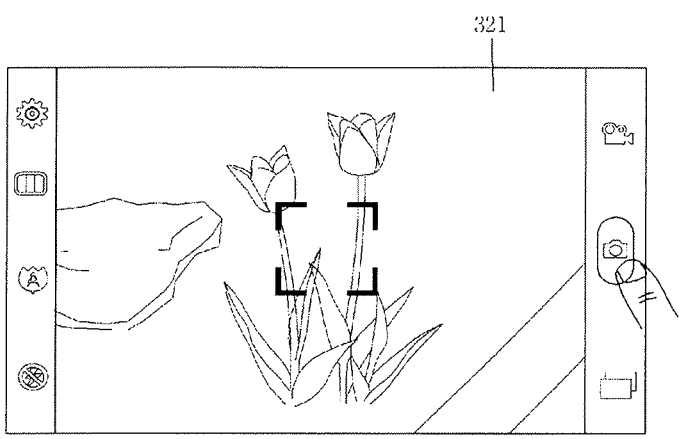

For example, referring to FIGS. 3A and 3B, in the state where the specific background image 301 is set as the reference image, a photographic image 321 that results from capturing one portion 320 of the specific background image 301 is a subordinate image associated with the reference image. In addition, although not illustrated, when the subordinate image is captured, a given indicator (for example, a text indicator indicating a "subordinate" image) indicating that the captured subordinate image is the subordinate image and/or a given indicator (for example, a text indicator indicating a "subordinate image of an A image") indicating the corresponding the reference image are output to one region of an image that is displayed on a review screen.

In order to determine the subordinate image, when storing the captured photographic images, the controller 180 performs the pattern matching between pixels of the captured photographic image and pixels of the reference image stored in the already-designated folder. As a result of the pattern matching, when it is determined that the captured photographic image is pattern-matched to one portion of the reference image to the extent to which a pattern-matched region of the captured photographic image is equal to or greater than the reference pattern-matched region, the controller 180 determines the captured photographic image as the subordinate image of the reference image.

In addition, in another example, the multiple subordinate images associated with the reference image are photographic images each of which is not pattern-matched to the preset reference image, but is captured or downloaded for a predetermined time in a state where a specific reference image is set, and thus is regarded as being included as one portion of the reference image.

To do this, when a preset input signal is detected in a state where a photographing mode is activated, the controller 180 determines that the photographic images captured thereafter are the subordinate images of the preset reference image. On the other hand, when it is detected that the preset input signal is not present, the controller 180 stores the photographic images captured thereafter as general photographic images, not the subordinate images.

In this manner, when the subordinate image associated with the reference image is determined, the controller 180 brings the multiple captured subordinate images into one group, based on the reference image being set. Subsequently, based on a preset reference, the controller 180 determines the display position on the reference image, in which each of the subordinate images brought into one group is positioned (S230).

At this point, the preset references include a reference against which it is determined that with a user's touch input, an image is included as one portion of the reference image or that the image is pattern-matched to the reference image to the extent to which an pattern-matched region of the image is equal to or greater than the reference pattern-matched region and thus is included as one portion of the reference image.

In this manner, when the subordinate image associated with the reference image is determined and the display position on the reference image, in which each of the subordinate images is positioned is determined, subordinate image information and display position information are stored in the memory 160.

Subsequently, when the group image view mode is activated on a screen corresponding to the execution of the gallery application (S240) (it is also possible that a general image view mode is activated), a preset reference image corresponding to the input is displayed on an entire screen of the display unit 151 of the mobile terminal 100. Then, graphic objects that correspond to the subordinate images brought into one group, respectively, are output to the determined display positions, respectively, on the reference image on the display unit 151 (S250).

At this point, the group image view mode means a mode in which on a screen corresponding to the execution of the gallery application, according to selection of a folder on which at least one preset reference image is stored, the reference images (and the subordinate images thereof) are displayed in order in which the reference images are stored.

In addition, at this point, the graphic object is a thumbnail of the subordinate image that corresponds to the display position, or an image or text that indicates that an attached image file is present on the display position. In addition, the graphic object is changed to various images based on the user input, or an already-displayed image, as described below in detail, is changed based on view history information.

Figure 3C:
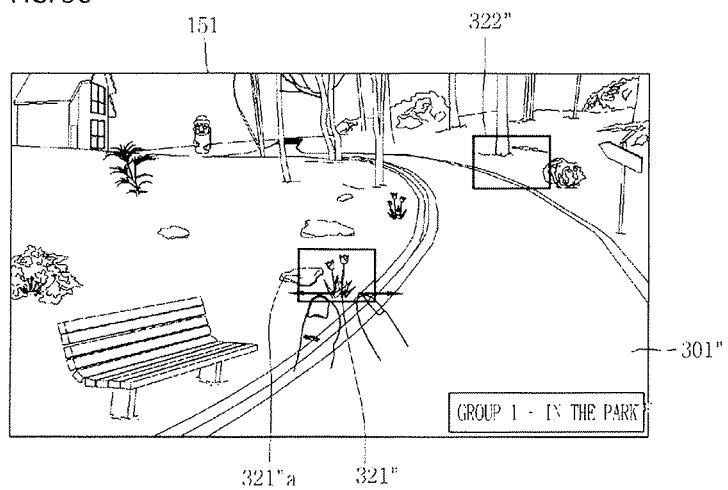

For example, referring to FIG. 3C, when the group image view mode is activated on the screen corresponding to the execution of the gallery application, a reference background image 301" including multiple subordinates 321" and 322"

are output to the display 151. Then, a title (for example "GROUP 1—IN THE PARK) of the reference background image 301" is displayed on one region, for example, a lower region, of the reference background image 301".

Figure 3D:
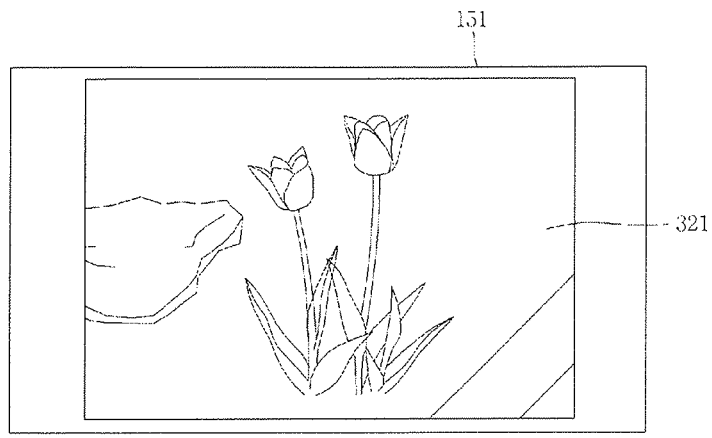

On the other hand, in the reference background image 301" in FIG. 3C, when the user applies a multi-touch input, for example, a pinch-out touch to a frame image 321" a displayed on a specific display position in which the subordinate image is positioned, a subordinate image 321 positioned on that display position, as illustrated in FIG. 3D is output to the entire screen of the display unit 151.

At this time, a value of a threshold distance between touch points corresponding to the pinch-out touch, according to which the subordinate image is output to the entire screen of the display unit 151, is determined in advance according to the multi-touch input.

In addition, in another example, an output size of the subordinate image may be determined in proportion to the distance between the two points corresponding to the pinch-out touch. That is, if the distance between the touch points corresponding to the pinch-out touch is small, the controller 180 enlarges the subordinate image only as much as the subordinate image corresponds to the distance between the touch points, without outputting the subordinate image to the entire screen.

On the other hand, in a state where the subordinate image is output to the entire screen of the display 151, for example, when pinch-in touch is applied, the controller 180 outputs back the reference image corresponding to the entire screen of the display unit 151. In addition, similarly to that described above, in another example, the output size of the subordinate image may be determined in proportion to the distance between the touch points corresponding to the pinch-in touch. That is, if the distance between the two points corresponding to the pinch-in touch is large, the subordinate image is reduced and the reference image is output only to a background screen outside of the subordinate image.

As described above, according to the embodiments of the present invention, the multiple associated photographic images are arranged at the meaningful points, respectively, on the one reference image. Thus, the user can check the associated photographs at a time, and can search for the desired subordinate photographic image in an easier, faster manner.

A method of determining the display positions of the multiple subordinate images is described below in more detail in connection with Step S230 described above.

FIGS. 4A to 4D are diagrams for describing the method of determining the display positions of the multiple subordinate images associated with the reference image according to the embodiment of the present invention.

First, the positions of the multiple images associated with the reference image are manually through the touch input to the reference image.

When the reference image is set, the reference image being set is output to the entire screen of the display unit 151. In a state where the reference image is output, when the multiple subordinate images associated with the reference image are captured or stored, the controller 180 brings the multiple subordinate images into one group.

Subsequently, the controller 180 outputs a thumbnail of each of the subordinate images brought into one group is output to one region of the display unit. At this time, the thumbnails of the subordinate images are output to a predetermined point in a superposed manner or are sequentially output, in the form of a list, to a predetermined region. At this time, there is no limitation to the position in which the thumbnail of each subordinate image. For example, the thumbnail of each subordinate image is output to an arbitrary point on the reference image or is output, in the form of a list, to a region (for example, a lower region) that is distinguished from a region to which the reference image is output.

When the thumbnail of the subordinate image is output to the display unit 151, the user can apply a drag touch input to the thumbnail being output, and thus moves the thumbnail to a desired position.

Then, the controller 180 determines as the display position of each subordinate image a point at which the drag touch input applied to the thumbnail of the subordinate image is terminated. In addition, the visually-distinguished display position is separately output to the thumbnail of the subordinate image of which the display position is determined, a highlight effect (for example, blinking) is output to the thumbnail, or the thumbnail is changed to a different object (for example, a clip image).

Figure 4A:
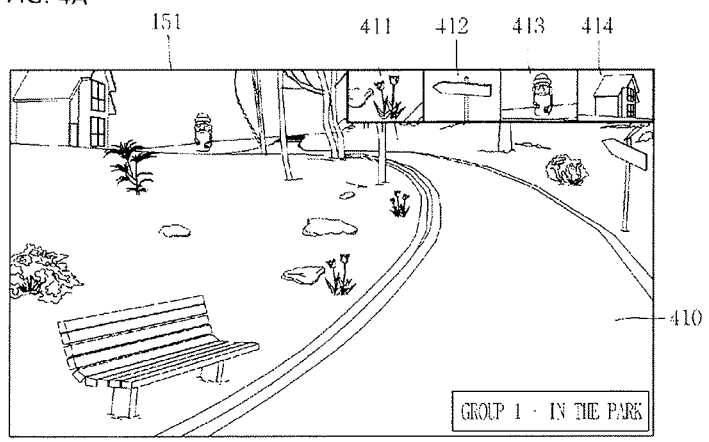
FIGS. 4A to 4D are diagrams for describing a method of determining display positions of the multiple subordinate images associated with the reference image according to the embodiment of the present invention.
Figure 4B:
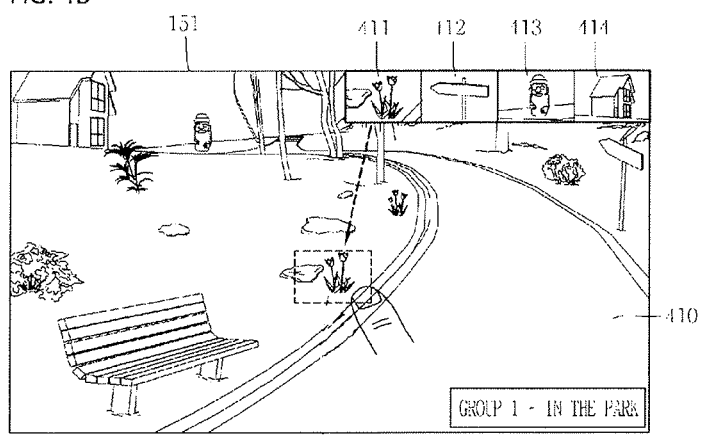
Figure 4C:
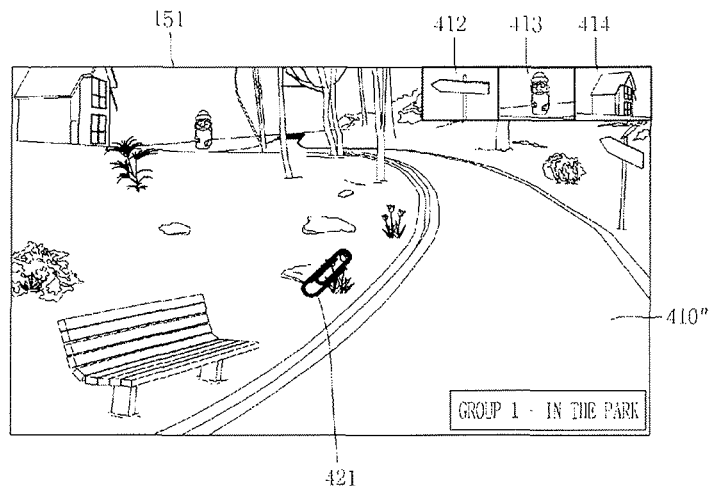
Figure 4D:
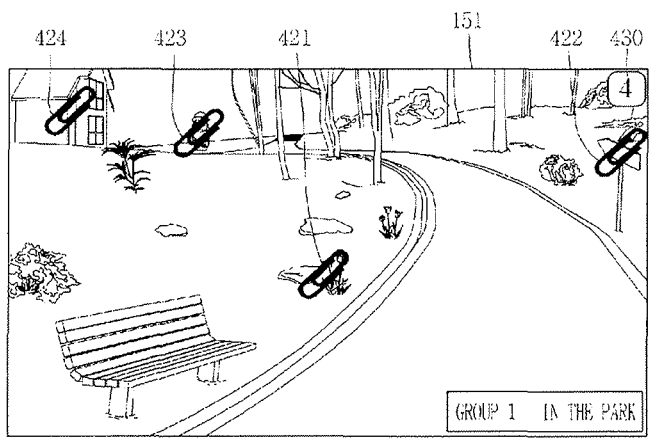

For example, referring to FIG. 0.4A, a reference background image 410 is output to the entire screen of the display unit 151, and thumbnails 411 to 414 that correspond to the associated subordinate images, respectively, are output to one region, for example, an upper region, of the reference background image 410. When the user, as illustrated in FIG. 4B, drags the touch input applied to a specific thumbnail 411 to a desired display position, the thumbnail 411, as illustrated in FIG. 4C, is moved to the user-designated display position, and it is apparent from FIG. 4C that a clip image 421 is displayed, as a graphic object indicating that the subordinate image is present, on the display position. When display positions of other thumbnails 412, 413, and 414 are designated, clip images 421, 422, 423, and 424, as illustrated in FIG. 4D, are displayed on the display positions, respectively, that are designated on the reference background image 410, and information 430 on the number of the subordinate images included in one region of a reference background image 410".

On the other hand, in another example, a possible display position may be determined in advance before determining the subordinate image of the reference image. For example, if the reference image is a map image, when the user points to several positions in a state where the map image is output, the positions that the user point to are determined as the display positions, and a given image (for example, an image in the shape of a pole) is output to every determined display position.

In addition, when a flicking touch input is applied to a specific thumbnail in a direction of the determined display position, the specific thumbnail is moved to that display position. At this time, when the specific thumbnail is moved, a specific animation effect (for example, an effect in which the thumbnail, like a magnet, is attracted to that display position) is output together. In addition, if the multiple thumbnails are moved to the same display position, only the most recently moved thumbnail is configured to be displayed on the same display position, and an indicator indicating that the thumbnails are superimposed on top of another is configured to be output.

In addition, if when storing the subordinate image corresponding to a specific thumbnail, the user inputs positional information (for example, pieces of information on latitude and longitude) and sets the map image including the latitude and the longitude as the reference image, a specific thumbnail moves by itself to a display position that corresponds to the positional information that is input.

On the other hand, the positions of the multiple images associated with the reference image are automatically determined according to the pattern matching to the reference image. The pattern matching applies to all the images that according to user's setting, are already stored or are newly added. For example, when the user captures the reference background image at a remote distance and sets the captured reference background image as the reference image, and performs proximity photographing thereafter, the subordinate image is obtained that is pattern-matched to one portion of the reference image.

That is, the controller 180 automatically determines as the display position of the subordinate image a region of the preset reference image, to which the subordinate image is pattern-matched to the extent to which a pattern-matched region of the subordinate image is equal to or greater than the reference pattern-matched region.

At this time, through the setting unit 181, the user can set an image range in which an image is matched to the reference image. For example, the setting unit 181 performs the setting through the user input in such a manner that the pattern matching is performed on only images that are captured for a given time are matched or that the pattern matching is performed on only images that are stored on a specified folder.

On the other hand, according to the embodiment of the present invention, if among the subordinate images included in the reference image, a desired specific subordinate image is intended to be output to the entire screen, additional information on the subordinate image is further provided in such a manner that the user can make a selection in an easier manner.

In this context, FIGS. 5A to 5E are diagrams for describing a method of outputting the subordinate image selected from the reference image to the entire screen according to the embodiment of the present invention.

When the group image view mode is activated on a screen corresponding to the execution of the gallery application, at least one reference image is displayed on the entire screen in order in which the reference images are stored. Then, the graphic object that indicates the display position on which each of the subordinate images brought into one group is positioned is outputs on each reference image.

At this time, when a first touch input is detected as being applied to at least one among the graphic objects that are output, the controller 180 controls the display unit 151 in such a manner that additional information is displayed that relates to the subordinate image corresponding to the graphic object to which the touch input is detected as being applied.

At this point, the pieces of additional information relating to the subordinate image includes information for identifying the subordinate image corresponding to the display position. For example, the pieces of additional information include at least one or more pieces of information, among information on the number of the subordinate images, information on a place where the subordinate image is captured, information on a date and time at which the subordinate image is captured, information on a period of time for which the subordinate image is viewed, and information on the number of times that the subordinate image is viewed.

In addition, at this point, the first touch input, for example, is any one among a short and a short double touch input touch that are applied to a specific graphic object.

Figure 5A:
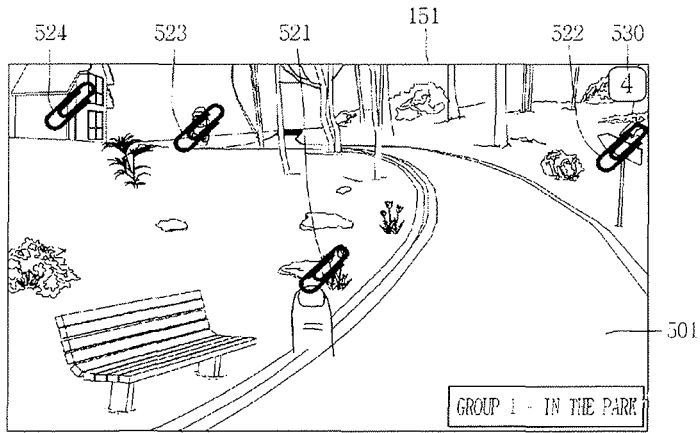
FIGS. 5A to 5E are diagrams for describing a method of outputting the subordinate image selected from the reference image to an entire screen according to the embodiment of the present invention.

For example, referring to FIG. 5A, in a state where a reference background image 501 and clip images 521 to 524, as graphic objects indicating the positions of the subordinate images included in the reference background image 501 are output on the entire screen of the display 151, when the user applies the touch input to a specific clip image 521, a thumbnail 521" of the subordinate image that corresponds to the specific clip image 521 is displayed on that position. Then, as illustrated in FIG. 5B along with this, an alerting window 531 pops up that alerts the user to information relating to the thumbnail 521", for example, such as the time at which the subordinate image corresponding to the thumbnail 521" is captured, the number of other subordinate images included in that position, information on the history showing how often the subordinate image is viewed (for example, the number of times that the touch is applied to).

In addition, when a second touch input is detected as being applied to one among the graphic objects displayed on the reference image, the controller 180 controls the display unit 151 in such a manner that the subordinate image corresponding to the graphic object to which the second touch is detected as being applied is output to the entire screen.

At this point, the second touch input is a predetermined-type touch distinguished from the first touch input, and for example, is the pinch-out touch that is applied to a specific thumbnail or graphic object.

Figure 5B:
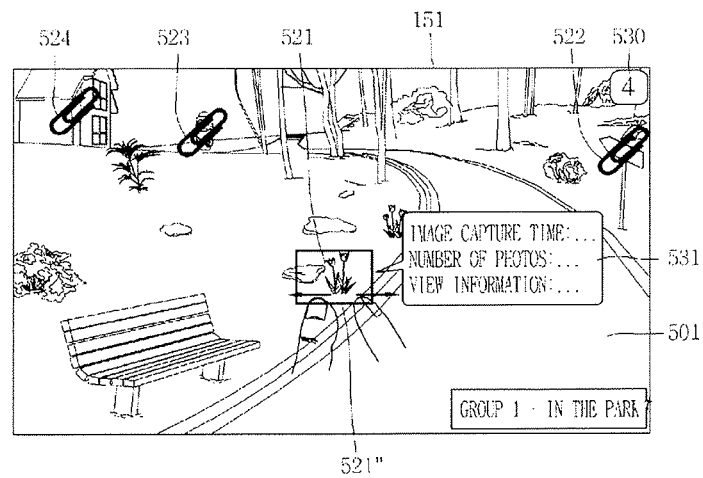
Figure 5C:
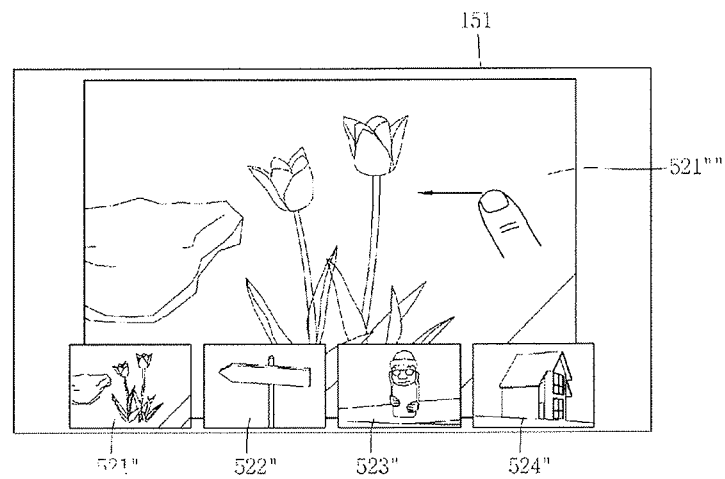

For example, as illustrated in FIG. 5B, in a state where a thumbnail of the subordinate image and additional information 530 are output to the reference background image 501, when the user applies the pinch-out touch to the thumbnail, an image corresponding to the thumbnail, as illustrated in FIG. 5C, is output to the entire screen of the display unit 151 (521""). On the other hand, thumbnails 521", 522", 523" and 524" of the subordinate images included in the reference background image 501" are output, in the form of a list, to a lower region of the subordinate image 521" corresponding to the thumbnail.

On the other hand, in this manner, in a state where the subordinate image corresponding to the graphic object to which the second touch input is detected as being applied is output to the entire screen of the display unit 151, when the touch in one direction is detected as being applied to the subordinate image that is output, the controller 180 controls the display unit 151 in such a manner that the next subordinate image that corresponds to the one direction is output.

Figure 5D:
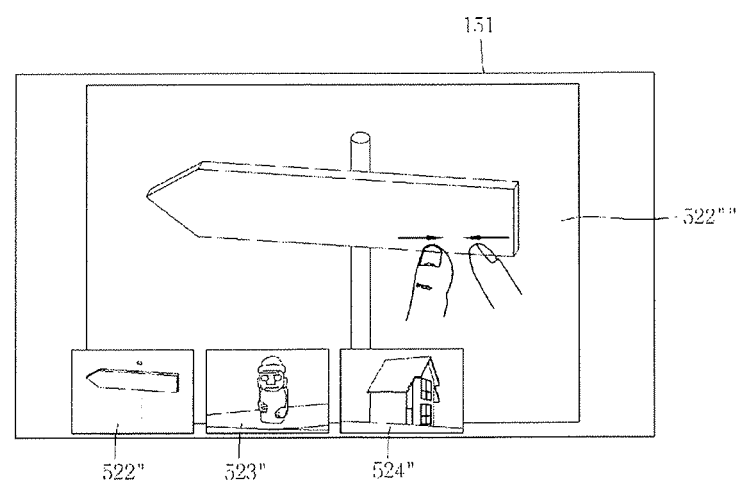

For example, as illustrated in FIG. 5C, when the flicking touch input is applied to the subordinate image that is output, in the leftward direction, to the entire screen of the display unit 151, the next image, 522" included in the reference background 501, as illustrated in FIG. 5D, is output to the entire screen of the display unit 151 (522""). At this time, although not illustrated, if the multiple subordinate images are included in the same display position on the reference background image 501, only a representative subordinate image is output to the entire screen of the display unit 151, or the multiple subordinate images that are positioned in the same positions, respectively, are output to the display unit 151 at a time in a manner that distinguishes the multiple subordinate images.

In addition, in a state where the subordinate images are output to the entire screen of the display unit 151, when the preset input signal is detected, the controller 180 performs control in such a manner that the reference image is output back to the entire screen of the display unit 151. At this point, the preset input signal is an input signal for a control command, that is opposite in direction to the second touch input described above, and for example, is the pinch-in touch that is applied to the subordinate image.

Figure 5E:
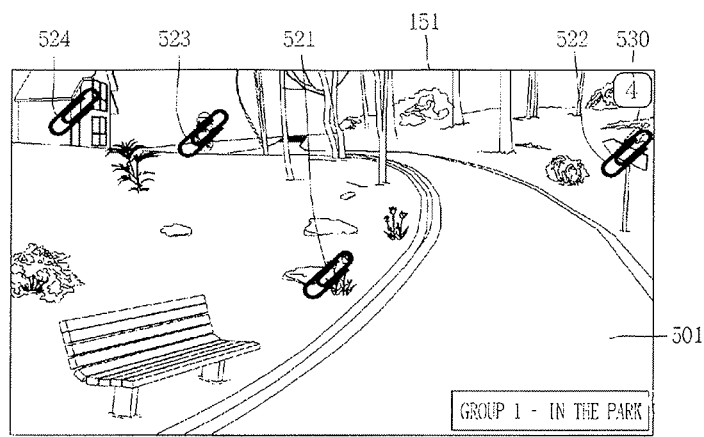

For example, when the user applies the pinch-in touch to a specific subordinate image 522" that is output to the entire screen of the display unit 151 in FIG. 5D, the reference background image 501 including the specific subordinate image 522" as its one portion is displayed as illustrated in FIG. 5E.

In addition, although not illustrated, the controller 180 outputs a given highlight effect to the graphic object corresponding to the subordinate image that was previously output to the entire screen of the display unit 151, and thus alerts the user to the display position of the subordinate image that he/she viewed previously.

The methods according to the embodiments of the present invention are described above in which the display positions of the subordinate image associated with the reference image are determined and a specific subordinate image included in the reference image is displayed on the entire screen.

With specific examples, a method is described below in which the view history information on the subordinate image is provided to the reference image in such a manner that the photographic image that are viewed a great number of times by the user can be easily selected.

In this context, FIG. 6A to 6G are diagrams for describing a method of displaying generation information on and the view history information on the multiple subordinate images that are displayed on the reference image, according to the embodiment of the present invention.

The graphic objects that indicate the positions of the multiple subordinate images, respectively, are output to the preset reference image. When the second touch input (for example, the pinch-out touch) is applied to at least one among the graphic objects, the controller 180, as described above, controls the display unit 151 in such a manner that the subordinate image corresponding to the graphic object to which the second touch is detected as being applied is output to the entire screen.

At this time, based on the second touch input, the controller 180 generates the view history information on each of the subordinate images brought into one group.

More specifically, when the pinch-out touch is detected as being applied to a specific object and a period of time during which the subordinate image is displayed on the entire screen exceeds a given time, the controller 180 determines the subordinate image is viewed, and thus updates the already-stored view history information.

At this time, the controller 180 generates the view history information based on various pieces of information, in addition to being based on the second touch input. Specifically, the controller 180 brings the subordinate images, which are successively captured for a given time, into one group, and calculates weight based on the number of times that each of the subordinate images brought into one group is viewed, a period of time for which each of the subordinate images is viewed, and the number of times that each of the subordinate images is zoomed in. For example, when it is determined that the pinch-out touch is detected as being applied to a specific graphic object and thus the subordinate image is viewed, the view history information to which weight 1 is assigned is generated. As another example, in a state where the subordinate image is output to the entire screen of the display unit 151, if a zoom-in touch is detected as being applied, it is determined that the user is much interested in the subordinate image, and thus the view history information to which weight 2 is assigned is generated.

Based on the view history information that is generated or updated in this manner, the controller 180 differently changes the graphic object corresponding to each of the subordinate images brought into one group.

Specifically, based on the view history information, the greater the number of times that the subordinate image that the graphic object corresponds to is viewed, the more greatly the controller 180 increases a size of the graphic object and outputs the graphic object that accordingly increase in size. For example, when the graphic object is the thumbnail of the subordinate image, the size of the thumbnail can be more increased for outputting. Alternatively, when the graphic object is in the shape of a preset frame indicating the position of the subordinate image, the graphic object can be changeably in the shape of a frame that is more largely sized.

Figure 6A:
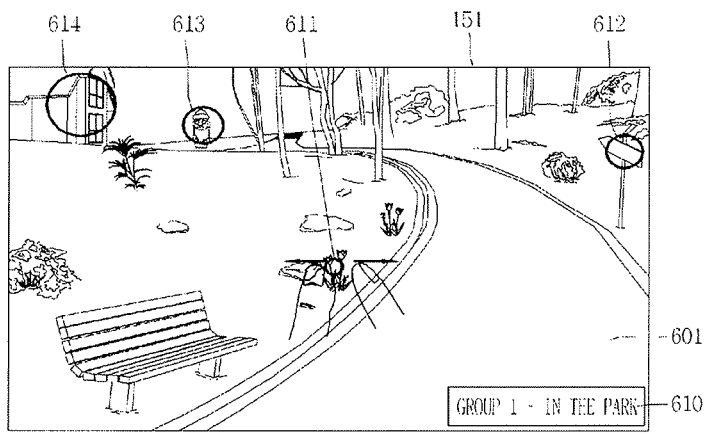
FIG. 6A to 6G are diagrams for describing a method of displaying generation information on and view history information on the multiple subordinate images that are displayed on the reference image, according to the embodiment of the present invention.

For example, referring to FIG. 6A, if a reference background image 601 includes four of the subordinate images, frames 611, 612, 613, and 614 that indicate the positions of the subordinate images, respectively, are generated in such a manner as to include pieces of view history information on the corresponding subordinate images, respectively. For example, the greater the number of times that the subordinate image is viewed, the more greatly the size of the frame is increased. In contrast, the smaller the number of times that the subordinate image is viewed, the more greatly the size of the frame is reduced. When the subordinate image has not been viewed, the size of the frame is reduced as well. The size of the frame is relatively determined based on each piece of view history information. It is apparent at a glance from FIG. 6A that a frame 611 of a display position 1 is the smallest and thus the number of times that the subordinate image in the position is viewed is the smallest.

Figure 6B:
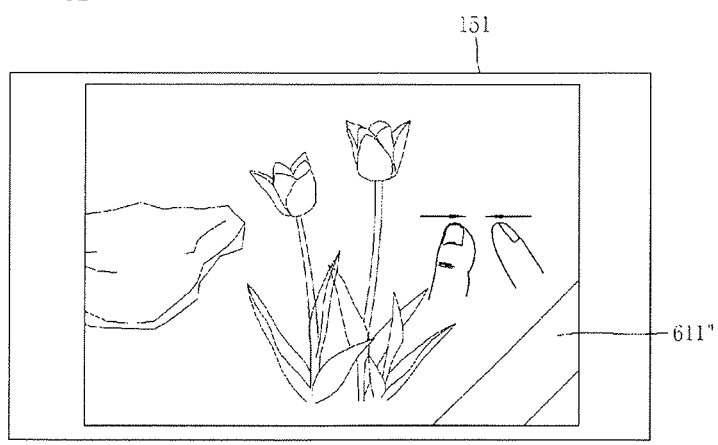

The user applies the pinch-out touch to the first display position 611 and thus a subordinate image 611" corresponding to the first display position 611, as illustrated in FIG. 6B, is output to the entire screen of the display unit 151. In this state, when the pinch-in touch is detected as being applied to the subordinate image 611", a reference background image 601", as illustrated in FIG. 6C, is output back to the entire screen.

Figure 6C:
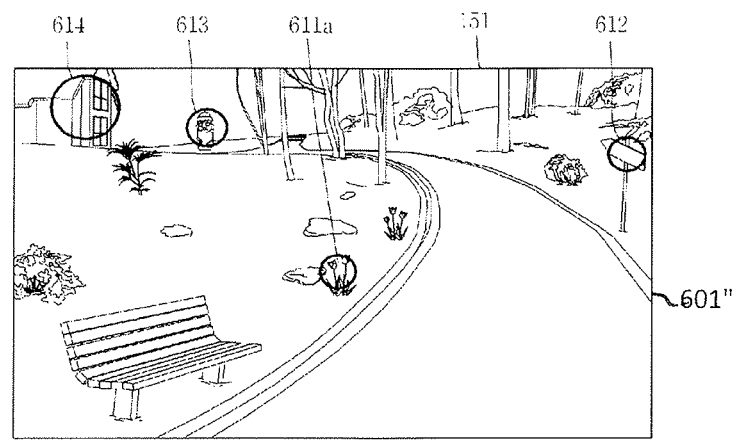

At this time, it is apparent from FIG. 6C that the size of the frame 611a that is output to the display position 1 is increased more than before. Accordingly, if the user wants to view a specific subordinate image from the reference background image, he/she can visually immediately check whether the subordinate image is viewed a large number of times. For this reason, the photographic image that the user viewed with interest is easily selected back.

On the other hand, bases on the view history information on the subordinate image, the controller 180 deletes from the reference image the subordinate image that has not been once reviewed for a given period of time.

More specifically, in a state where each of the subordinate images brought into one group is output to an corresponding position, when a preset event occurs, the controller 180 performs control in such a manner that the number of times that each subordinate image is viewed is compared with a reference value, based on the generated view history information, and the graphic object corresponding to the thumbnail of the subordinate image, which has been viewed a smaller number of time than the reference value, is deleted.

At this point, the subordinate image is deleted only from the reference image, but an original version of the subordinate image remains stored in the memory 160. In addition, at this point, the preset event is either of a case where a preset time elapses and a case where the view history information on the subordinate image is updated.

Figure 6D:
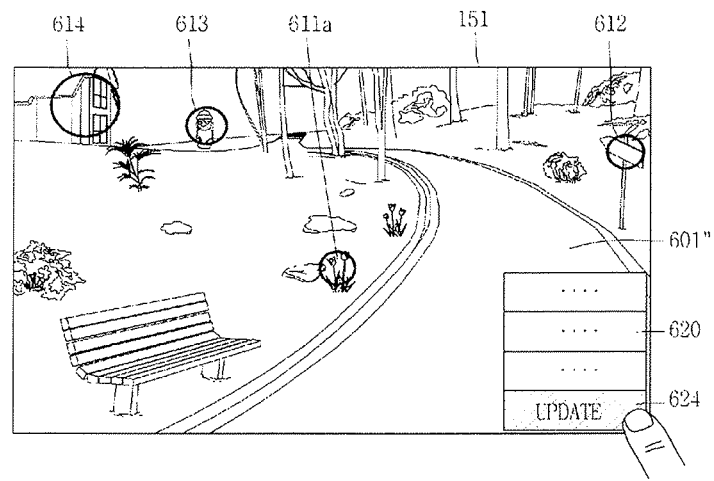
Figure 6E:
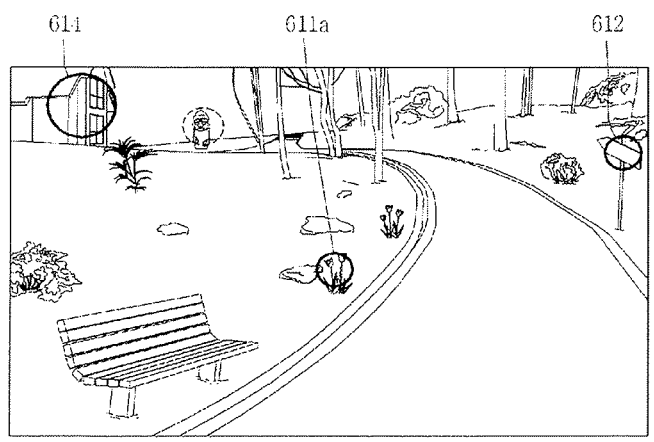

For example, referring to FIGS. 6D and 6E, in a state where the reference background image 601" is displayed, when an update item 624 is selected from a context menu 620 that pops up through the input, the pieces of view history information on the subordinate images included in the reference background image 601" are updated. Accordingly, a frame 613 of the display position corresponding to the subordinate image that have not been once viewed disappears from the screen as illustrated in FIG. 6E.

In addition, when a preset input signal is detected, the controller 180 initializes the generated view history information. The changed graphic object is restored to its original state based on the view history information. At this point, the preset input signal is a control command to initialize the view history information on the subordinate image.

Figure 6F:
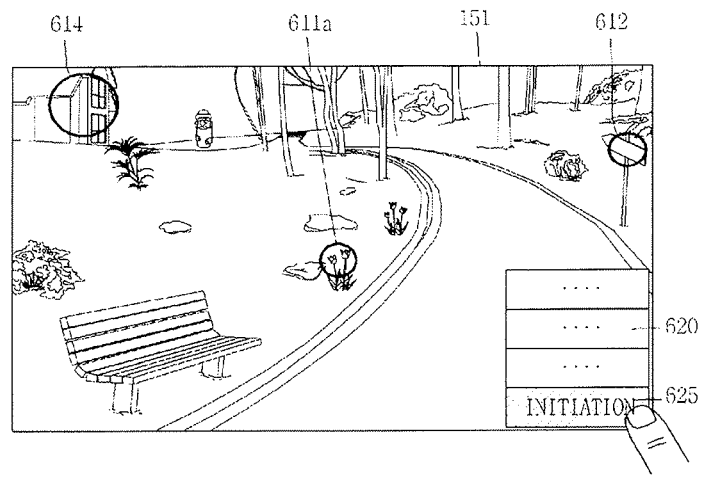
Figure 6G:
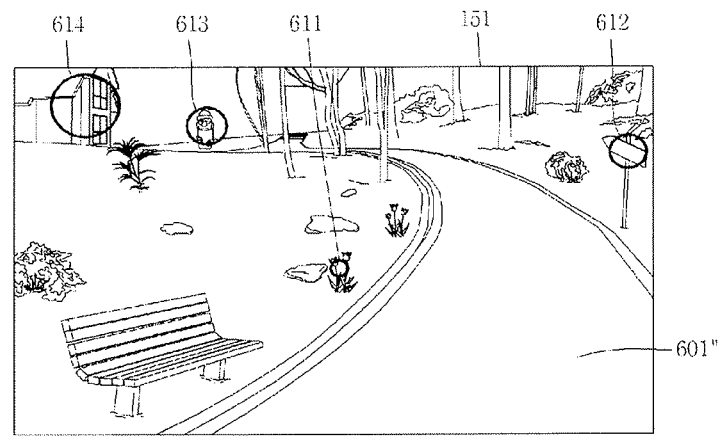

For example, referring to FIGS. 6F and 6G, in a state where the reference background image 601" is displayed, when an initialization item 625 is selected from the context menu 620 that pops up through the input, the pieces of view history information on the subordinate images included in the reference background image 601" are initialized. Accordingly as illustrated in FIG. 6G, the frames of the display positions, which were changed in size, are restored to their original states. That is, the frame 611 of the display position 1 is reduced to its original size, and the frame 613 of a display position 613 that disappeared appears back on the reference background image 601".

On the other hand, in order to assign a sense of reality corresponding to the view, a given image effect is output to a graphic object corresponding to the display position of the subordinate image based on the view history information on the subordinate image.

Figure 7A:
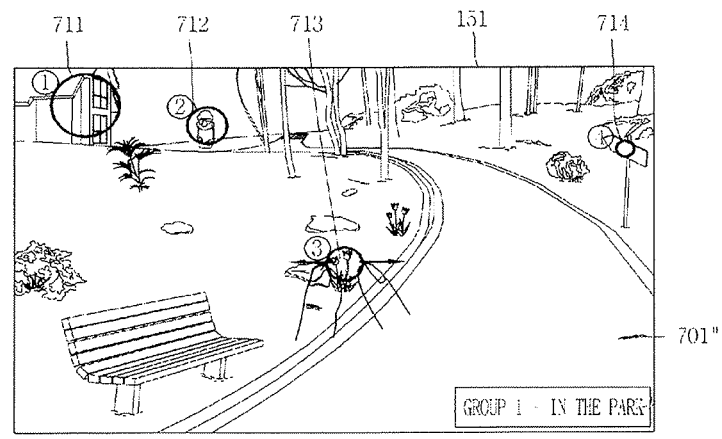
FIGS. 7A to 7C are diagrams for describing a method of outputting an image effect to a graphic object corresponding to the display position of the subordinate image viewed on the reference image according to the embodiment of the present invention.
Figure 7B:
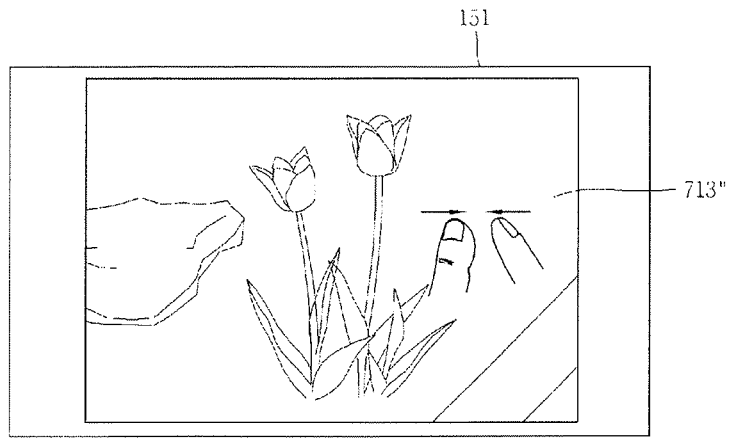
Figure 7C:
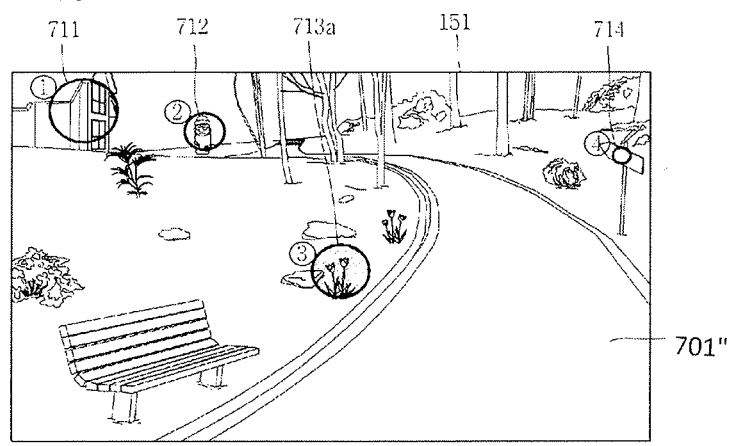

In this context, FIGS. 7A to 7C are diagrams for describing a method of outputting an image effect to the graphic object corresponding to the display position of the subordinate image viewed on the reference image according to the embodiment of the present invention.

In a state where the preset reference image and the display positions of the multiple subordinate images, each of which is included, as one portion of the reference, in the reference image, are output, the controller 180 outputs the image effect corresponding to the chronological order in which the subordinate images were captured, to the graphic object corresponding to each of the subordinate images brought into one group.

At this point, for example, the image effects corresponding to the chronological order in which the subordinate images were captured include a color-fading effect, a shape-crumpled effect, a layer-removed effect and the like that indicate the passage of time, and a text image that directly indicates the time when the subordinate image was captured or an ordinal number. If the multiple subordinate images were not successively captured, that is, if the multiple subordinate images were captured at different time intervals, a different image effect is applied to a graphical object corresponding to each subordinate image.

Then, when the subordinate image corresponding to the graphic object is detected as being viewed, the controller 180 differently changes the image effect that appears on the graphic object.

For example, graphical objects 711 to 714 are output to the display positions, respectively, of the subordinate images on the reference background image 701" in FIG. 7A, and text images ①②③, and ④, each indicating the ordinal number corresponding to the chronological order in which the subordinate images were captured, are output to the graphical objects 711 to 714, respectively. The user applies the pinch-out touch to a specific graphic object 713 and thus, as illustrated in FIG. 7B, the corresponding subordinate image 713" is output to the entire screen. When the pinch-in touch is applied in this state, as illustrated in FIG. 7C, an image effect, for example, the color-fading effect, which indicates that the subordinate images were viewed, appears on a corresponding specific graphic object region 713a of the restored reference background image 701".

As described above, according to the embodiment of the present invention, the pieces of view history information on the multiple associated photographic images are generated and thus visually-distinguished indicators are provided to one reference image. Thus, the extent to which the user is interested in the corresponding subordinate image can be immediately recognized.

A method according to the embodiment of the present invention is described below in which if the multiple similar subordinate images are included in the same display position on the reference image, an image that the user views with interest can be easily selected.

Figure 8A:
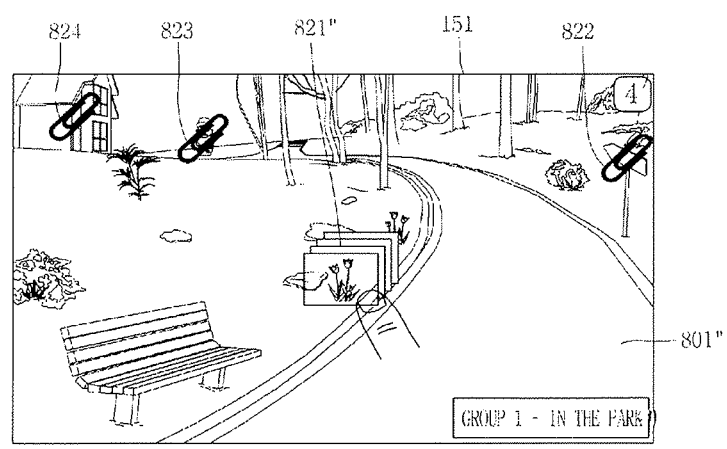
FIGS. 8A to 8C are diagrams for describing a method of displaying the multiple subordinate images on one display position on the reference image according to the embodiment of the present invention.
Figure 8B:
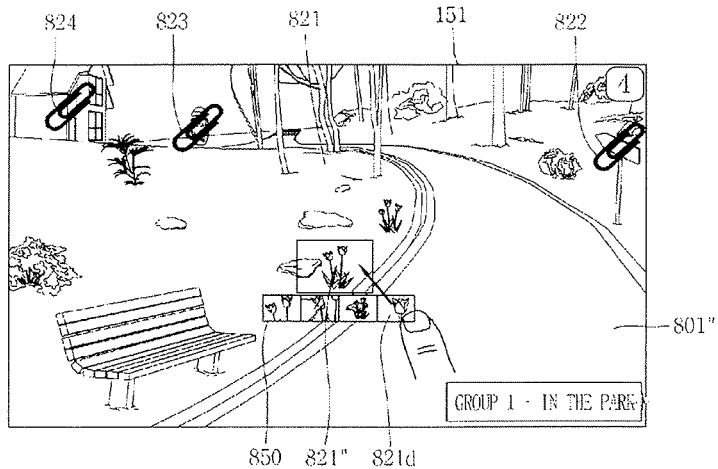
Figure 8C:
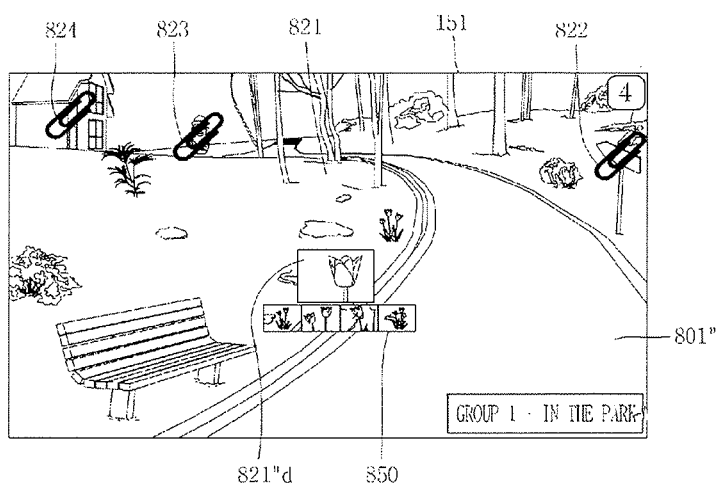

In this context, FIGS. 8A to 8C are diagrams for describing a method of displaying the multiple subordinate images on one display position on the reference image according to the embodiment of the present invention.

If the multiple subordinate images are included in the same display position on the reference image, the controller 180 performs control in such a manner that only a thumbnail of one representative subordinate image stratifying a preset condition is displayed on the display position.

At this time, the controller 180 determines the thumbnail of the representative subordinate image based on the view history information on each subordinate image. At this time, if the view history information has not been yet generated, or if many of the subordinate images are viewed the same number of times, the controller 180 determines as the thumbnail of the representative subordinate image a subordinate image that was earliest captured or a subordinate image that was latest captured.

When the thumbnail of the representative subordinate image is determined in this manner, if the first touch input or the second touch input is detected as being applied to a specific graphic object on the reference image, the controller 180 performs control in such a manner that the thumbnail of the representative subordinate image or only the representative subordinate image is output to the display unit 151.

On the other hand, when the view history information is changed, or when a new subordinate image is captured, the controller 180 changes the thumbnail of the already-determined representative subordinate.

In addition, the controller 180 may change the already-determined representative subordinate image through the input. Specifically, in response to the preset touch being detected as being applied to the thumbnail of the representative subordinate image, thumbnails of multiple other subordinate images included in the display position are displayed on one region of the display unit 151. Then, when the touch applied to one of the thumbnails of other subordinate images that are output is dragged to the display position, the controller 180 immediately changes the thumbnail of the representative subordinate image to the thumbnail to which the touch is applied.

For example, in a state where multiple graphic objects, for example, clip images 821, 822, 823, and 824, that correspond to the display positions of the multiple subordinate images are output to the display unit 151 in FIG. 8A, when the user applies the touch (for example, the first touch input) to the clip image 821, a thumbnail 821" of the representative subordinate image included in the display position and a superimposition display effect indicating that the other subordinate images are further present are output.

Subsequently, when the user applies the touch to the thumbnail 821" of the representative subordinate image, a thumbnail list 850 of the other subordinate images is displayed on an lower region as illustrated in FIG. 8B. If the user wants to change the representative subordinate image, he/she can apply the touch to a thumbnail 821d of a desired subordinate image on the thumbnail list 850 and then move the thumbnail 821d to a display position to which the thumbnail 821" of the representative subordinate image is output, in order to change the thumbnail of the representative subordinate image as illustrated in FIG. 8C (821"d).

The method of generating and displaying the pieces of view history information on the multiple subordinate images included in the reference image is described above. A method of integrating the multiple reference images connectedly into one integration reference image is described below.

According to the embodiment of the present invention, the setting unit 181 sets the multiple reference images. The multiple reference images that are set are sequentially stored in a folder that is designated on the screen corresponding to the execution of the gallery application. Then, when the group image view mode is activated, the reference images are output to the display unit 151 in the order in which the reference images are stored in the designated folder.

When a command to delete the reference image is input in the group image view mode, the controller 180 deletes the reference image and the subordinate images that are brought into one group based on the reference image together. The command to delete the reference image is performed through the user input in a state where the reference image or the thumbnail list is output to the entire screen of the display unit 151.

In addition, the controller 180 integrates the multiple reference images, which are set, connectedly into one integration reference image and thus displays the one integration reference image. In this context, FIGS. 9A to 9D are diagrams for describing a method of updating the display positions of the subordinate images that are associated with the integration reference image into which the multiple reference images are integrated connectedly, according to the embodiment of the present invention.

Specifically, if the setting unit 181 sets first and second reference images, the controller 180 integrates the first and second reference images connectedly into one integration reference image based on one direction of the selected first reference image, and outputs the one integration reference image.

In a state where the first and second reference images are integrated connectedly into one integration reference image in this manner, when the group image view mode is activated, the controller 180 resizes the first and second reference images and updates the display position of each of the associated subordinate images.

Figure 9A:
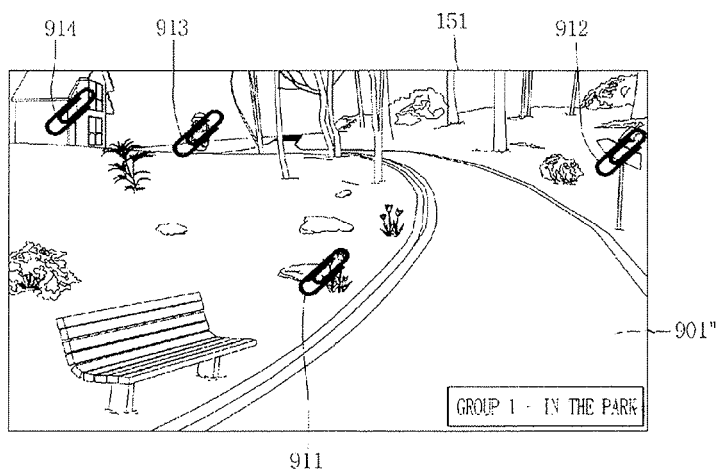
FIGS. 9A to 9D are diagrams for describing a method of integrating the multiple reference images and thus updating the display positions of the associated subordinate images according to the embodiment of the present invention.
Figure 9B:
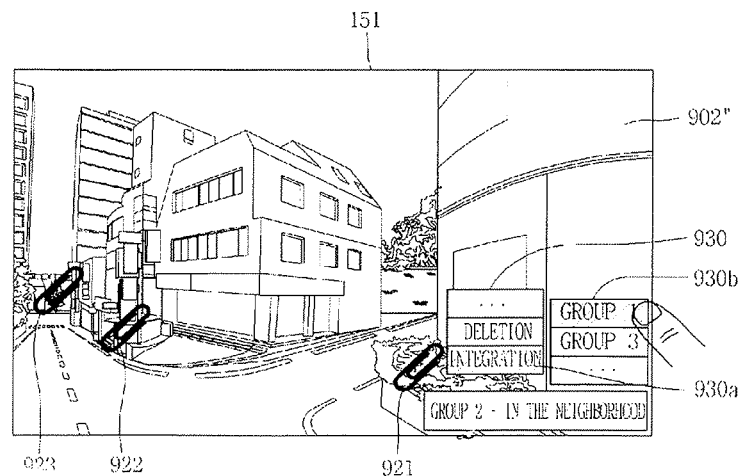
Figure 9C:
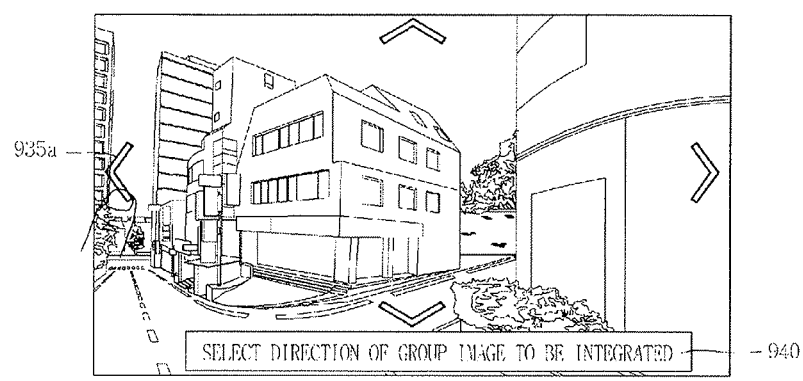
Figure 9D:
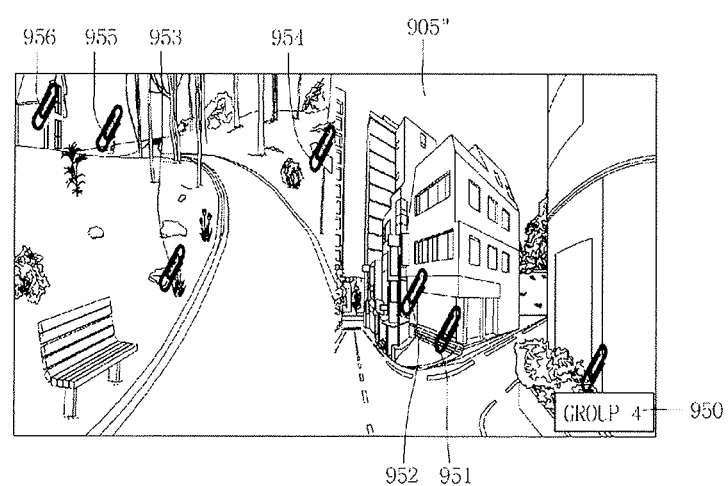

Referring to FIGS. 9A and 9B, when in the group image view mode, the touch is applied, in one direction, to the first reference image 901" ("GROUP 1—IN THE PARK") including graphic objects 911 to 914 that correspond to the multiple subordinate images, respectively, the next reference image 902" (GROUP 2—IN THE NEIGHBORHOOD) is output that includes graphic images 921 to 923 which correspond to the multiple subordinate images, respectively. At this time, when through a key operation, the user selects a "integration" item 930a from a context menu 930 that pops up and selects "GROUP 1" 930b, a sub item, a guide message 940 guiding a direction of integrating a "GROUP 1" reference image and selection of the direction is output to a lower portion of the display unit 151. When through the touch input, the user selects the direction of integrating the "GROUP 1" reference image (935a), as illustrated in FIG. 9D, an integration reference image "GROUP 4" 950 into which the "GROUP 1" reference image is connectedly integrated is displayed in the direction that is selected on the "GROUP 2" reference image 905". Graphic images 951 to 956 are also displayed as shown in FIG. 9D.

At this time, the controller 180 resizes sizes of the "GROUP 1" reference image 901" and the "GROUP 2" reference image 902" and updates the display positions of the subordinate images each of which is included as one portion, in such a manner that the display position corresponds a size of the resized reference image.

As described above, when the multiple reference image are connectedly integrated, the already-captures photographic images are integrated and categorized in a meaningful manner in accordance in accordance with a reference that the user wants. For example, even though the user travels for a long time, going from one place to another, he/she can set the reference image for every place, and capture the subordinate images. Thereafter, the user can integrate the reference images and thus produce one travel story.

As described above, in the mobile terminal and in the method of controlling the mobile terminal according to the embodiments of the present invention, the multiple associated photographic images are arranged at points, respectively, on one reference image, and are displayed as arranged. Thus, the user can search for desired photographic images in easier, faster manner. In addition, the pieces of view history information on the multiple associated photographic images are generated and thus are displayed in a visually-distinguished manner. This provides an advantage of immediately recognizing the extent to which the user is interested in the corresponding subordinate image can be immediately recognized.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The computer may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a setting unit configured to set a reference image;
an imaging unit that captures multiple subordinate images associated with the reference image;
a controller that groups the multiple captured subordinate images based on the reference image and stores the grouped subordinate images, and determines a display position on the reference image, of each of the subordinate images brought into the group, according to the preset reference; and
a touch screen, when a group image view mode is activated, on whose entire screen the reference image is displayed and a graphic object corresponding to each of the grouped subordinate images is displayed to the determined display position.

2. The mobile terminal of claim 1, wherein the controller controls the touch screen to output a thumbnail of each of the grouped subordinate images, and determines a point at which a drag touch input applied to the thumbnail is terminated, as the display position of each of the grouped subordinate images.

3. The mobile terminal of claim 1, wherein the controller determines as the display position of a corresponding subordinate image a region of the reference image, to which the corresponding subordinate image is pattern-matched to an extent to which a pattern-matched region of the corresponding subordinate image is equal to or greater than a reference pattern-matched region.

4. The mobile terminal of claim 1, wherein when a first touch input is detected as being applied to one among the graphic objects that are output to the display position, the controller controls the touch screen to display additional information that relates to a subordinate image corresponding to the graphic object to which the touch input is detected as being applied.

5. The mobile terminal of claim 4, wherein the additional information includes at least one of a number of the subordinate images that correspond to the display position to which the first touch input is detected as being applied, information on a place where the subordinate image is captured, information on a date and time at which the subordinate image is captured, information on a period of time for which the subordinate image is viewed, and information on a number of times that the subordinate image is viewed.

6. The mobile terminal of claim 4, wherein when a second touch input is detected as being applied to the one among the graphic objects, the controller controls the touch screen to output the subordinate image corresponding to the graphic object to which the second touch input is detected as being applied to an entire screen.

7. The mobile terminal of claim 6, wherein when a touch in one direction is detected as being applied to the subordinate image output to the entire screen, the controller controls the touch screen to output a next subordinate image corresponding to the one direction.

8. The mobile terminal of claim 6, wherein when a preset input signal is detected in the state where the subordinate image is output to the entire screen, the controller displays the reference image back to the entire screen and outputs a highlight effect is output to the graphic object corresponding to the previously-output subordinate image.

9. The mobile terminal of claim 6, wherein based on the second touch input, the controller generates view history information on each of the grouped subordinate images, and based on the generated view history information, the controller differently changes the graphic object corresponding to each of the grouped subordinate images.

10. The mobile terminal of claim 9, wherein the controller groups the subordinate images that are successively captured for a given time, calculates weight based on a number of times that each of the grouped subordinate images is viewed, a period of time for which each of the grouped subordinate images is viewed, and a number of times that each of the subordinate images is zoomed in, and applies the calculated weight to the view history information.

11. The mobile terminal of claim 9, wherein based on the generated view history information, the greater the number of times that the subordinate image is viewed, the greater the size of the graphic object corresponding to the subordinate image.

12. The mobile terminal of claim 9, wherein the controller controls the touch screen to output a thumbnail of each of the grouped subordinate images to the corresponding display position, and
wherein when an event occurs, based on the generated view history information, the controller compares the number of times that each of the subordinate images is viewed, with a reference value and deletes the thumbnail of the subordinate image and the corresponding graphic object that is viewed a smaller number of times than the reference value.

13. The mobile terminal of claim 1, wherein the controller outputs an image effect corresponding to a chronological order in which the subordinate images were captured to the graphic object corresponding to each of the subordinate images brought into the group.

14. The mobile terminal of claim 13, wherein when the subordinate image corresponding to the graphic object is detected as being viewed, the controller differently changes the image effect that is output to the graphic object.

15. The mobile terminal of claim 1, wherein if the multiple subordinate images are included in one display position, the controller controls the touch screen to display a thumbnail of one representative subordinate image satisfying a preset condition on the display position.

16. The mobile terminal of claim 15, wherein in response to a preset touch applied to the thumbnail of the representative subordinate image, thumbnails of multiple other subordinate images are displayed on one region of the touch screen, and
wherein when a touch applied to one of the thumbnails of the multiple other subordinate images is dragged to the display position, the controller controls the touch screen to change the thumbnail of the representative subordinate image to the thumbnail to which the touch is applied.

17. The mobile terminal of claim 1, wherein a command to delete the reference image is input in the group image view mode, the controller deletes the reference image and the grouped subordinate images based on the reference image together.

18. The mobile terminal of claim 1, wherein if the setting unit sets first and second reference images, the controller integrates the first and second reference images connectedly into one integration reference image based on one direction of the selected first reference image, controls the touch screen to output the one integration reference image, and updates the display position of each of the subordinate images associated with the first and second reference images.

19. A method of controlling a mobile terminal, the method comprising:
  setting a reference image;
  capturing multiple subordinate images associated with the reference image via an imaging unit;
  grouping, via a controller, the multiple captured subordinate images based on the reference image and determining a display position on the reference image, of each of the grouped subordinate images according to a preset reference; and
  displaying the reference image on an entire screen and outputting a graphic object corresponding to each of the grouped subordinate images to the determined display position when a group image view mode is activated.

20. The method of claim 19, wherein the reference image is a photographic image to which each of the grouped subordinate images is pattern-matched to an extent to which a pattern-matched region of the each of the subordinate images is equal to or greater than a reference pattern-matched region, or a specific image that is selected from among stored images.

21. A mobile terminal comprising:
  a setting unit configured to set a reference image;
  an imaging unit that captures multiple subordinate images associated with the reference image;
  a controller that groups the multiple captured subordinate images based on the reference image and stores the grouped subordinate images, and determines a display position on the reference image, of each of the subordinate images brought into the group, according to a preset reference; and
  a memory configured to store information of the grouped subordinate images and display position information of each of the grouped subordinate images.

* * * * *